United States Patent [19]

Carlson et al.

[11] 3,711,563

[45] Jan. 16, 1973

[54] PRODUCTION OF HALOGENATED HALOCYCLOPENTADIENE ADDUCTS OF STYRENE

[75] Inventors: Richard D. Carlson, Grand Island; James L. Dever, Lewiston, both of N.Y.

[73] Assignee: Hooker Chemical Corporation, Niagara Falls, N.Y.

[22] Filed: June 29, 1970

[21] Appl. No.: 51,009

[52] U.S. Cl. ......... 260/649 R, 252/8.1, 210/615.7 R, 260/649 F, 260/880, 260/DIG. 24
[51] Int. Cl. .............................................. C07c 25/18
[58] Field of Search ....260/649 R, 649 F, 650, 611 A

[56] References Cited

UNITED STATES PATENTS

| | | | |
|---|---|---|---|
| 3,232,959 | 2/1966 | Hahn | 260/649 R |
| 2,606,910 | 8/1952 | Herzfeld et al. | 260/649 R X |
| 2,673,172 | 3/1954 | Polen et al. | 260/650 R X |
| 2,952,712 | 9/1960 | Roberts et al. | 260/649 R X |
| 2,607,802 | 8/1952 | Britton et al. | 260/650 R UX |
| 3,170,961 | 2/1965 | Britton et al. | 260/650 R |
| 3,285,965 | 11/1966 | Jenkner | 260/649 R |
| 2,473,990 | 6/1949 | Darragh | 260/650 R |
| 2,412,389 | 12/1946 | Cass | 260/650 R X |

FOREIGN PATENTS OR APPLICATIONS

| | | | |
|---|---|---|---|
| 651,528 | 4/1951 | Great Britain | 260/649 R |
| 652,112 | 4/1951 | Great Britain | 260/649 R |
| 860,198 | 12/1952 | Germany | 260/650 R |
| 991,067 | 5/1965 | Great Britain | 260/649 R |
| 986,634 | 3/1965 | Great Britain | 260/650 R |
| 737,793 | 10/1955 | Great Britain | 260/641 R |

OTHER PUBLICATIONS

Roberts et al., J. Org. Chem., 28, 1439–1440, 1963.
Williamson et al., J.A.C.S., 86, 4021–4025, 1964.

*Primary Examiner*—Howard T. Mars
*Attorney*—Peter F. Casella, Donald C. Studley, Richard P. Mueller, James F. Mudd and William J. Schramm

[57] ABSTRACT

A process is described for preparing halogenated halocyclopentadiene adducts of styrene by reacting a styrene derivative with a halogenated cyclopentadiene in a Diels-Alder reaction, and then halogenating the aromatic ring to contain between 1 and 5 halogen atoms.

The resulting compounds are useful as fire retardant additives in various elastomers and plastics, especially acrylonitrile-butadiene-styrene (ABS).

15 Claims, No Drawings

PRODUCTION OF HALOGENATED HALOCYCLOPENTADIENE ADDUCTS OF STYRENE

BACKGROUND OF THE INVENTION

The need for fire retardant additives in plastics has been increasing substantially in the past few years, particularly because of the Fabric Flammability Act and a number of other legislative measures. Halogenated derivatives have been a good source of fire retardant additives. Accordingly therefore, improved processes for producing said derivatives are required. A number of patents have issued describing processes for preparing various Diels-Alder adducts of halogenated cyclopentadienes. Among them are U.S. Pat. Nos. 2,606,910; 2,952,711; 2,952,712; 3,043,795 and 3,397,175. None of the above patents describes a simple economic method for producing the desired halogenated halocyclopentadiene styrene adducts.

It is an object of this application to produce in an economic manner halogenated cyclopentadiene adducts of styrenes. It is also an object to produce in high yields halogenated halocyclopentadiene adducts of styrenes.

SUMMARY OF THE INVENTION

Halogenated cyclopentadiene adducts of styrene are prepared by reacting a styrene derivative with a halogenated cyclopentadiene. The resulting Diels-Alder adduct is halogenated to produce between one and five halogen atoms on the aromatic ring.

The processing steps employ relatively inexpensive reactants and are conducted in a direct manner.

DESCRIPTION OF PREFERRED EMBODIMENTS

Halogenated cyclopentadiene adducts of styrene are prepared comprising (1) reacting a styrene derivative of the following structure

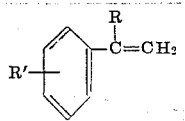

wherein R and R' are independently selected from the group consisting of hydrogen and lower alkyl of one to six carbon atoms, with a halogenated cyclopentadiene of the structure

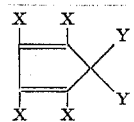

wherein X is halogen selected from the group consisting of fluorine, chlorine and bromine, and Y is a substituent independently selected from the group consisting of chlorine, fluorine, bromine, alkyl of one to 10 carbon atoms, preferably one to six carbons atoms, and halogen substituted alkyl of from one to 10 carbon atoms, preferably one to six carbon atoms, wherein the halogen is chlorine, fluorine or bromine, and (2) reacting the resulting adduct with a halogenating agent to produce between one and five halogen atoms on the aromatic ring providing that when bromine is the halogen on the aromatic ring, only up to four bromine atoms may be substituted thereon.

The molar ratio of reactants employed in step 1 ranges from about 0.05 moles to approximately 5 moles of halogenated cyclopentadiene per mole of styrene, preferably 0.5 to 2 moles of halogenated cyclopentadiene per mole of styrene and even more preferably on an equal molar ratio. The temperature of the first step, i.e., Diels-Alder addition ranges from about 50° C. to about 250° C., preferably about 100° C. to about 180° C. and even more preferably from about 140° C. to about 170° C. The temperature employed in the halogenation step ranges from about −50° C. to about 150° C., preferably from about 10° to about 110° C.

In the halogenation reaction, catalysts can be employed such as metals or metal halides, preferably the metal chloride or bromide; examples of some metals that may be used as catalysts are aluminum, zinc, iron, bismuth, titanium, copper, tellurium, mercury, lead, magnesium, cadmium, selenium, antimony and molybdenum; the aforementioned metals may be used as their chlorides or bromides in their role as catalysts. The amount of halogenation catalyst employed, on a weight percentage basis of the amount of adduct reactant, ranges from about 0.01 percent to about 10.0 percent.

The first reaction may be carried out in the absence of solvents. However, solvents inert to reactants and products may be used, such as, perchloroethylene, trichloroethylene, cyclohexane, etc. Solvents that may be employed in the halogenation step are solvents inert to the reactants and the reaction products. Such solvents are halogenated aliphatics such as acetylene tetrachloride, trichloromethane, hexachlorobutadiene, methylene chloride, and carbon tetrachloride, etc.

The chlorination agent preferably is chlorine. However, other compounds which will emit chlorine may be employed, such as $SCl_2$, $S_2Cl_2$, $SO_2Cl_2$, $PCl_5$, etc.

The preferred bromination reagent is a mixture of $Br_2$ and $Cl_2$. However other compounds which will emit bromine, such as, $SBr_2$, $S_2Br_2$, $Br_2$, $SO_2Br_2$, $PBr_5$, etc. can also be used. When employing a mixture of bromine and chlorine as the bromination reagent the molar ratios used are from about 0.5 to about 2 moles bromine per mole of chlorine, preferably equimolar and even more preferably an excess of chlorine, i.e. about 0.8 moles of bromine per mole of chlorine.

The amount of halogenation reagent employed for step 2 is dependent on the amount of halogen desired on the aromatic ring. The molar ratio of halogenation reagent ranges from about 1 to about 8 moles per mole of adduct, preferably about 3.5 to about 5 and even more preferably about 4 to about 4.5 per mole of adduct.

The compounds resulting from this process are halogenated halocyclopentadiene adducts of styrene, of the following structure:

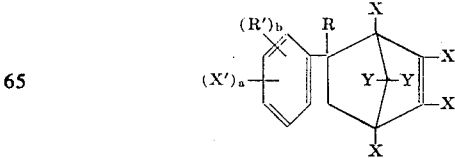

wherein X is a halogen independently selected from the group consisting of fluorine, chlorine and bromine;

Y is a substituent independently selected from the group consisting of fluorine, chlorine, bromine, alkyl of one to 10 carbon atoms, preferably alkyl of one to six carbon atoms, and halogen substituted alkyl of one to 10 carbon atoms, preferably halogen substituted alkyl of one to six carbon atoms, wherein the halogen is chlorine, fluorine or bromine;

X' is a halogen independently selected from the group consisting of chlorine, bromine and mixtures thereof;

R and R' are substituents independently selected from the group consisting of hydrogen and alkyl of one to six carbon atoms;

$a$ is from 1 to about 5, preferably about 5 to about 5;

$b$ is from 0 to 1 and $a+b=5$

When a mixture of bromine and chlorine is used as the bromination reagent to give tetrahalogenation, the resulting product will contain a mixture of chlorine and bromine substituted on the benzene ring. Generally about 10 percent to about 20 percent of the product will contain three bromine atoms and one chlorine atom substituted on the benzene ring with the rest of the product (about 80 to about 90 percent) being the tetrabrominated product.

The most preferred embodiment is hexachlorocyclopentadiene and styrene as reactants. In order to simplify discussion, reference will be made to the latter two compounds; however, it is recognized that other halogenated cyclopentadienes or styrene derivatives could be used in their respective places.

Some of the halogenated cyclopentadienes that may be employed are as follows: hexahalocyclopentadienes such as hexachlorocyclopentadiene, hexafluorocyclopentadiene, hexabromocyclopentadiene, pentachloromonobromocyclopentadiene, tetrachlorodibromocyclopentadiene, etc; monoalkyl pentahalocyclopentadienes, such as methylpentachlorocyclopentadiene; methylpentabromocyclopentadiene; dialkyltetrahalocyclopentadienes, such as dimethyltetrachlorocyclopentadiene, dimethyltetrabromocyclopentadiene.

Some of the halogen substituted alkyl cyclopentadienes are:

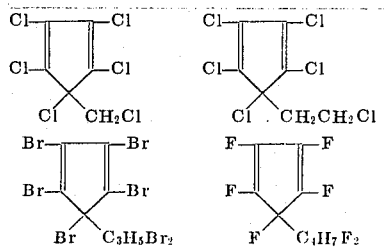

Some of the styrene compounds that may be employed are styrene, or

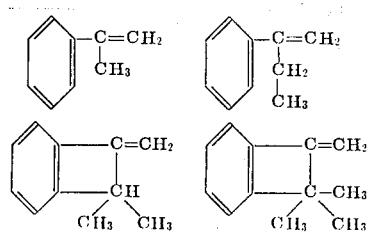

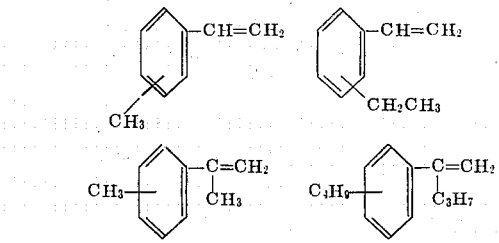

Some preferred novel compounds resulting from the process can be depicted as follows:

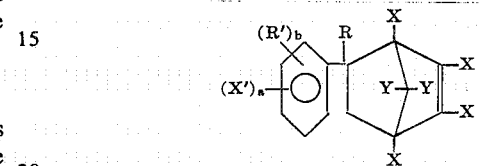

|  | R | R' | X | X' | Y | a | b |
|---|---|---|---|---|---|---|---|
| 1. | H | H | Cl | Cl | Cl | 4 | 1 |
| 2. | H | NP | Cl | Cl | Cl | 5 | 0 |
| 3. | H | —CH$_3$ | Cl | Cl | Cl | 4 | 1 |
| 4. | —CH$_3$ | H | Cl | Cl | Cl | 4 | 1 |
| 5. | H | NP | Cl | 4 Br & 1 Cl* | Cl | 4 | 0 |
| 6. | H | H | Cl | Br | Cl | 4 | 1 |
| 7. | H | NP | Cl | 3 Br & 2 Cl* | Cl | 5 | 0 |
| 8. | H | NP | Cl | Br | Cl | 5 | 0 |
| 9. | H | H | Br | Br | Br | 4 | 1 |

* = mixture of halogens (bromine and chlorine) on aromatic ring. NP = not present Having described the invention, below are working examples which illustrate embodiments of the invention so that one of skill in the art may practice the invention.

Unless otherwise illustrated, all temperatures are in degrees centigrade and all amounts are in parts by weight.

EXAMPLE 1 — Preparation of Diels-Alder adduct of styrene and hexachlorocyclopentadiene.

Into a 5 liter 3 neck flask was charged 4,095 g. of hexachlorocyclopentadiene and this was heated to 150°–160° C. Styrene (1,578 g) was added over 5–6 hours. The temperature was maintained at 150°–160° C. A small sample removed from the reaction vessel one hour after the addition was complete emitted no hexachlorocyclopentadiene odor. The flask was then heated at 150° C. under aspirator vacuum. After 2 hours, the vessel was purged with nitrogen. The product collected was 5,610 g. of a slightly yellowish solid with a melting point of 67°–73° C. Yield was calculated as 99 percent.

Analysis calculated for $C_{13}H_8Cl_6$:Cl, 56.5
Found      :Cl, 56.0

Infrared and NMR spectra confirm the assigned structure.

EXAMPLE 2— Chlorination of the Diels-Alder Adduct to a Tetrachlorinated Product.

A three neck flask was charged with 377 grams of the adduct prepared from styrene and hexachlorocyclopentadiene, 377 milliliters of hexachlorobutadiene and 10 grams of reduced iron powder. This mixture was heated and held at 60°–65° C. while gaseous chlorine was bubbled into the reaction mixture with a rapid stirring. After 5 hours the evolution of hydrogen chloride, as measured by weight pickup in a water trap on the exit gas line, had slowed to a negligible rate. The mixture was purged with nitrogen and filtered. The product was separated from the filtrate on cooling to room temperature, and filtered off. The crude product weighed 469 grams. The crude product was slightly yellow with a melting point of 127°–148° C. Extraction of this crude product with acetone produced an almost white product with a melting point of 140°–150° C. The yield was calculated to be about 91 percent. Elemental analysis and spectral data showed that the product was of the structure:

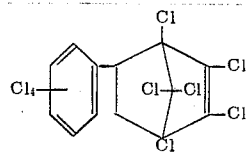

Equivalently good results are obtained when a catalyst of powdered iron (5.3 percent by weight) and powdered copper (1.32 percent by weight) is employed.

EXAMPLE 3 — Tetrabrominated Styrene-Hexachlorocyclopentadiene Adduct.

To a 250 ml. three-necked flask, equipped with a mechanical stirrer, addition funnel, immersion thermometer and reflux condenser, was charged 75.4 g. (0.2 mole) of the adduct of styrene and hexachlorocyclopentadiene and 5.3 g of powdered iron. To the stirred mixture, which was maintained in the molten state (85°–90°) with an oil bath, was added 159.9 g (1.0 mole) of bromine dropwise via the addition funnel during 4 hours. After stirring an additional 6.5 hours at 85°–103° and then standing at room temperature overnight, the crude solid was thoroughly extracted with benzene. The benzene extract was filtered and washed successively with sodium sulfite solution and then water. The solution was concentrated to give 120.1 g (86.4 percent yield) of crude product. The crude product was purified via recrystallization from benzene after the benzene solution had been treated with charcoal, m.p, 179°–180.5°.

Analysis calculated for $C_{13}H_4Br_4Cl_6$: C, 22.5; H, 0.6; Br, 46.2; Cl, 30.7.

Found: C, 22.6; H, 0.6; Br, 45.8; Cl, 30.6.

EXAMPLE 4 — Chlorination of Diels-Alder Adduct to give the Tetrachlorinated Derivative.

A 2 liter, 3 neck flask was equipped with a nitrogen flow tube, a stirrer, addition funnel, condenser, and thermometer. The flask was charged with 188.5 g. of the adduct of styrene and hexachlorocyclopentadiene, 500 ml. of carbon tetrachloride and 5 g. of $AlCl_3$. This mixture was heated to 48° C and a solution of 5 g. of $S_2Cl_2$ and 490 g. of $SO_2Cl_2$ added dropwise. The reaction mixture temperature rose to 70° C. where it was maintained with external heating for the 5 hour addition period, and 2.5 hours after completion of the addition. Then an additional 200 ml. of carbon tetrachloride was added followed by the slow addition of 200 ml. of water. The cooled reaction mixture was extracted successively with 1,100 ml. $H_2O$, 100 ml. 5% $NaHCO_3$ and 1,000 ml. of $H_2O$. After drying and filtering, the volatile material was stripped from the reaction mixture. The residue weighed 271.8 g. This was recrystallized from carbon tetrachloride to give the tetrachlorinated styrene hexachlorocyclopentadiene adduct with a melting point of 151°–154° C.

Calculated for $C_{13}H_4Cl_{10}$: Cl, 68.9
Found: Cl, 68.3.

EXAMPLE 5 — Chlorination of the Diels-Alder Adduct to Give a Trichlorinated Derivative.

A flask was charged with a 7,514 g. (0.2 moles) of the adduct of styrene and hexachlorocyclopentadiene, 2.5 g of reduced iron powder and 150 ml. of acetylene tetrachloride. A total of 47 g. of chlorine gas was bubbled into the reaction mixture which was maintained at approximately 55° C. The mixture was then cooled and filtered. The filtrate was washed with 20% HCl, 10 percent sodium bicarbonate and water. The solvent was then stripped off at reduced pressure to give an amber liquid as a residue. NMR analysis indicates the product to be a mixture of isomers of the trichlorinated adduct of styrene and hexachlorocyclopentadiene.

Calculated for $C_{13}H_5Cl_9$: Cl, 66.4
Found: Cl, 67.8

EXAMPLE 6 — Chlorination of Diels-Alder Adduct to Give the Pentachlorinated Derivative.

A flask was charged with 75.4 g. (0.2 moles) of the adduct of styrene and hexachlorocyclopentadiene and 250 ml. of carbon tetrachloride. A catalytic amount of aluminum, mercury, iodine and aluminum chloride was added. Chlorine gas was then bubbled into the mixture, which was held between 20° and 40° C., for 5 hours. After filtering the hot mixture an 84 percent yield of crude product was isolated from the filtrate. Recrystallization from carbon tetrachloride gave the pentachlorinated product with a melting point of 195°–195 ° C.

Calculated for $C_{13}H_3Cl_{11}$: Cl, 71.0
Found: Cl, 70.7.

EXAMPLE 7 — Tetrabrominated Styrene-Hexachlorocyclopentadiene Adduct.

To a 1,000 ml. three-necked flask, equipped with a mechanical stirrer, addition funnel, immersion thermometer and gas outlet tube, was charged 301.6 g. (0.8 mole) of styrene-hexachlorocyclopentadiene adduct and 30 g. iron powder. This mixture was heated to 84° C. and 800 g. of bromine was added dropwise during 11.5 hours while the reaction mixture was maintained at 70°–90° C. after heating at 78° C for an additional 0.5 hours, the molten mixture was allowed to stand overnight. The residual bromine vapors were largely flushed from the solidified reaction mixture with a stream of $N_2$ and then this solid was thoroughly extracted with benzene. After the benzene solution had been filtered, it was then washed with water, sodium-sulfite solution and again with water and concentrated to 850 ml. The desired product crystallized out and was washed with 400 ml. of acetone to give 400 g. (m.p. 178.5–181.5 of tetrabrominated styrene-hexachlorocyclopentadiene adduct. A second crop was obtained and washed with 70 ml. of acetone (81 g. m.p. 171–177) The yield of desired product based on the two crops was 86.8 percent.

EXAMPLE 8 — Bromination of Diels-Alder Adduct to give the Tetrabrominated Derivative.

A solution of 192 g. (1.2 moles) of bromine and 85 g. (1.2 moles) of chlorine in 50 ml. of acetylene tetrachloride was added dropwise to a stirred mixture of 3 g of antimony metal in a solution of 150.8 g. (0.4 mole) of the adduct of styrene and hexachlorocyclopentadiene and 125 ml. of acetylene tetrachloride at such a rate (during three-fourths hours) that the heat of reaction maintained the reaction temperature at 39°–55. The dark brown reaction mixture was stirred an additional 6 hours and then the reaction was flushed with $N_2$ free of the excess bromine and chlorine. Twenty milliliters of water was added and the light solid was filtered off. This was washed with water to give 215 g. (79 percent yield) of tetrabrominated styrene hexachlorocyclopentadiene adduct m.p. 172°–175°.

Calculated for $C_{13}H_4Br_4Cl_6$: C, 22.5; H, 0.6; Br, 46.2; Cl, 30.7.

Found: C, 22.75; H, 0.49; Br, 43,78; Cl, 29.73.

EXAMPLE 9 — Bromination of the Diels-Alder Adduct to give the Tetrabrominated Derivative.

A 2 l. three-necked flask, equipped with a mechanical stirrer addition, funnel, dry ice condenser, immersion thermometer and gas inlet tube, was charged with 5 g. of iron, 439 g. (2.75 mole) of bromine, 99 g. (1.40 mole) of chlorine (via the gas inlet tube), and 50 ml. of acetylene tetrachloride. During 4 hours, a solution of 150.8 g. (0.4 mole) of the adduct of styrene and hexachlorocyclopentadiene in 125 ml. of acetylene tetrachloride was added dropwise at such a rate that the reaction temperature did not rise above 37°. The excess halogenation reagent was distilled off by heating the reaction mixture and flushing it with nitrogen. An additional 250 ml. of acetylene tetrachloride was added and the solution was treated with decolorizing carbon. After the solution had been filtered and concentrated 202 g. (72 percent yield) of tetrabromostyrene hexachlorocyclopentadiene adduct crystallized out, m.p. 175°–179°.

EXAMPLE 10 — Bromination of the Diels-Alder Adduct to give the Monobrominated Derivative.

A solution of 46 g. (0.29 mole) of bromine and 22 g. (0.32 moles) of chlorine in 50 ml. of acetylene tetrachloride was added to a stirred mixture of 10 g. of antimony chloride and a solution of 150.8 g. (0.4 mole) of the adduct of styrene and hexachlorocyclopentadiene in 120 ml. of acetylene tetrachloride at such a rate (during 20 minutes) that the heat of reaction maintained the reaction temperature at 42°–44°. The dark reaction mixture was stirred an additional 2 hours and then the reaction was flushed with $N_2$ free of the excess bromine and chlorine. Twenty milliliters of water was added to the clear solution and the decomposed catalyst was then filtered off. The solution was concentrated and allowed to crystallize to give the monobromo styrene hexachlorocyclopentadiene adduct, m.p. 116°–126°. Recrystallization from hexane gave an analytical sample, m.p. 128°–131°.

The spectral and elemental analyses were consistent with the assigned structure.

EXAMPLE 11 - Halogenation of the Monobrominated Derivative of the Diels-Alder Adduct to give the Pentahalogenated Derivative.

A solution of 768 g. (4.8 mole) of bromine and 340 g. (4.8 mole) of chlorine was added during 3 hours to a stirred solution composed of 35 g. of antimony chloride, 500 g. (1.1 mole) of the monobrominated adduct of styrene and hexachlorocyclopentadiene and 700 ml. of acetylene tetrachloride. The addition was made at such a rate that the reaction temperature did not rise above 50°. After stirring an additional 3 hours the excess halogenation reagent was flushed off with a stream of $N_2$; the solid product was filtered off and washed with fresh acetylene tetrachloride to give 225 g. of crude product. This was recrystallized from benzene to give a analytical sample of pentahalo styrene hexachlorocyclopentadiene adduct, m.p. 194°–203°.

Elemental and Spectral Analyses indicated that the product is a mixture of pentahalogenated styrene-hexachlorocyclopentadiene adducts, averaging between three and four bromine atoms per molecule and seven and eight chlorine atoms per molecule.

An alternative method of preparing the halogenated halocyclopentadiene adducts of styrene would be as follows:

1. react a compound of the structure

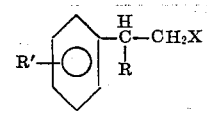

with a halogenating agent so that the aromatic ring is halogenated; this may be performed in the presence of metal catalysts, such as, iron; R = hydrogen or alkyl of one to six carbon atoms; X is bromine or chlorine: See *Textbook of Organic Chemistry*, Noller, Second Edition (1958) W.B. Saunders & Co., page 326 and following.

2. dehydrohalogenate the side chain with alcoholic KOH, see *Organic Chemistry*, Cram & Hammond Second Edition McGraw-Hill Book Company (1964), page 330 and following and U.S. Pat. No. 2,569,131; and 3. reacting the halogenated styrene with a halocyclopentadiene (such as hexachlorocyclopentadiene) in a Diels-Alder reaction. See U.S. Pat. No. 2,606,910 and Ser. No. 51,012, filed on even date herewith.

The halogenated styrene cyclopentadiene adducts are useful as fire retardant additives for various polymers and plastics compositions such as ABS, high impact polystyrene and others. Some of the plastic compositions in which these adducts could be used are described in U.S. Pat. No. 3,403,036. Preferred compositions are ABS and others described in Ser. No. 51,008 filed on even date herewith.

We claim:

1. A compound of the formula

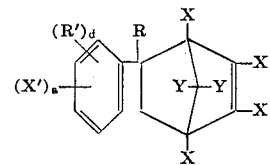

wherein R and R' are independently selected from the group consisting of hydrogen and alkyl of one to six carbon atoms, X is a halogen selected from the group consisting of fluorine, chlorine and bromine; Y is independently selected from the group consisting of chlorine, bromine, fluorine, alkyl of one to 10 carbon atoms and halogenated alkyl of one to 10 carbon atoms, wherein said halogen is selected from the group consisting of chlorine, bromine and fluorine; X' is independently selected from the group consisting of chlorine, bromine and mixtures thereof; $a$ is from about 4 to 5, $b$ is 0 to 1 and $a+b=5$.

2. The compound of claim 1 wherein X is chlorine.
3. The compound of claim 1 wherein Y is chlorine.
4. The compound of claim 1 wherein X and Y are chlorine.
5. The compound of claim 1 wherein R is hydrogen.
6. The compound of claim 1 wherein R' is hydrogen.
7. The compound of claim 1 wherein X' is a mixture of chlorine and bromine.
8. The compound of claim 1 wherein X' is chlorine.
9. The compound of claim 1 wherein X' is bromine.
10. The compound of claim 7 wherein X and Y are chlorine.
11. The compound of claim 9 wherein X and Y are chlorine.
12. The compound of claim 10 wherein X and Y are chlorine.
13. The compound of claim 1 of the structure

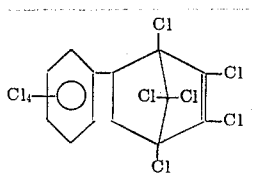

14. The compound of claim 1 of the structure

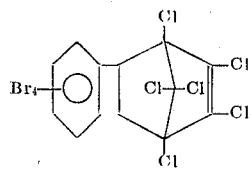

15. The compound of claim 7 wherein from about 10 to about 20 percent by weight of said compound contains three bromine atoms and one chlorine atom substituted on the benzene ring and from about 90 to about 80 percent by weight of said compound contains four bromine atoms.

* * * * *